March 23, 1965  W. F. HOWARTH ETAL  3,174,502
THEFT PREVENTION APPARATUS
Filed June 14, 1963

INVENTOR.
WILLIAM F. HOWARTH
LEE E. NOYES
BY
Pearson + Pearson
ATTORNEYS 3,174,502
THEFT PREVENTION APPARATUS
William F. Howarth, 241 Middlesex St., North Andover, Mass., and Lee E. Noyes, Hidden Road, Andover, Mass.
Filed June 14, 1963, Ser. No. 287,904
6 Claims. (Cl. 137—351)

This invention relates to theft prevention apparatus for gasoline engine propelled devices such as automobiles, boats, airplanes and similar devices.

It has therefore been proposed to provide an electrically operated cut-off valve in the gasoline feed line, or in the hydraulic brake line, of such vehicles, the solenoid coils being included in an electric circuit having a switch whereby the coils are energized and the valves are open when the switch closes the circuit. It has also been proposed to provide various other theft prevention expedients associated with the ignition switch of automobiles wherein a hidden switch must be actuated or a particular combination or code of switches must be actuated in order to energize the ignition circuit. However, in general, these mechanisms do not foil a thief who bypasses the switch mechanisms with a jumper or who uses a separate power supply in order to energize the ignition system of the automobile.

The principal object of this invention is to provide theft prevention apparatus in which the ignition circuit when the ignition switch is in the "off" position is directly short circuited to the grounded conductive switch housing to short the input side of the ignition coils thereby making the ignition coil system inoperative despite attempts to bypass the ignition switch.

Another object of the invention is to provide a theft prevention apparatus for gasoline engine ignition systems wherein one pole of the battery is grounded and the ignition switch in the "off" position is grounded directly to the battery, without the use of any exposed cable capable of being cut, thereby short circuiting the ignition coil if the switch is bypassed when in the off position.

A further object of the invention is to provide a gasoline vehicle theft prevention apparatus in which the input sides of the ignition coil, the coil of a solenoid cut-off valve in the gas line and the coil of a solenoid valve in the brake line are all short circuited when the ignition switch is in the "off" position but are all energized when the switch is in the "on" position.

Still another object of the invention is to provide a theft prevention apparatus which prevents a gasoline engine from being started by bypassing the ignition switch, keeps the brakes in applied position if the vehicle is towed and causes the vehicle to run out of gasoline if by chance the motor is successfully started when the ignition switch is in the "off" position.

Other objects and advantages of the invention will be apparent from the claims, the description of the drawings and from the drawings in which:

Figure 1:
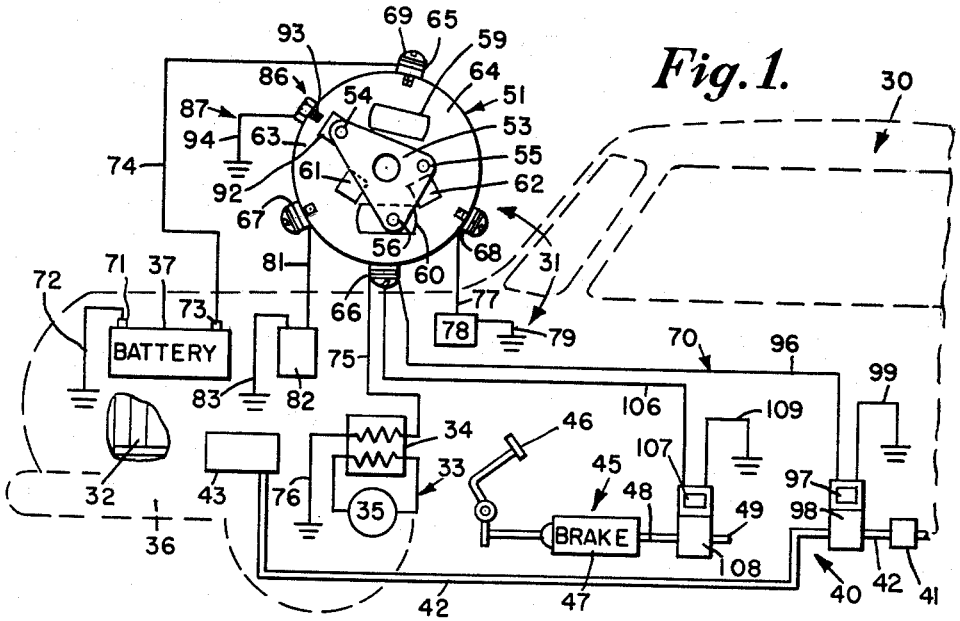
FIG. 1 is a diagrammatic, fragmentary, side elevation of a typical gasoline engine propelled device showing the theft prevention apparatus of the invention and the electric circuit thereof.

A typical gasoline engine propelled device, such as an automobile 30, is shown diagrammatically in FIGURE 1, upon which a preferred embodiment of the theft prevention apparatus 31 of the invention is illustrated. However, it will be seen that the apparatus is applicable to boats, airplanes, and the like, all of which are intended to be included within the scope of the invention.

The automobile 30 convenientionally includes a gasoline engine 32, an ignition system 33 for engine 32 of any well known type having an ignition coil 34 and a distributor 35, a conductive body 36 serving as a ground, and a battery 37. Automobile 30 also includes the conventional gasoline feed, or supply, system 40, including the tank not shown, a pump 41, a gasoline pressure line 42 and carburator 43. Automobile 30 also includes the conventional hydraulic brake system 45 including the foot pedal 46, master brake cylinder 47, hydraulic fluid pressure line 48 and the fluid conduits 49 leading to the brakes not shown.

Conventionally, most gasoline engine propelled devices include an ignition switch 51 of well known type, lockable by an ignition key 52 and having at least an "on" position wherein the ignition circuit is closed, and an "off" position in which the ignition circuit is open. In the particular switch illustrated, turning of the removable key 52 turns a conductive triangular armature 53, the armature having three protruding contact points 54, 55 and 56 each of which is spring pressed outwardly by springs such as 57.

Opposed to the armature 53 are a plurality of spaced, wiping contact plates usually including the elongated battery plate 59, the elongated ignition plate 60, the starter plate 61, the accessory, or radio, plate 62 and the insulated areas such as 63 between the plates, all arranged circumferentially so that various circuits are made and broken as the points of the armature are turned in their circular paths. Each plate is connected by a suitable conductor, through the insulative disc 64 in which the plates are mounted, to a suitable terminal 65, 66, 67 and 68 corresponding to plates 59, 60, 61 and 62 and each having a suitable machine screw 69 for connection to the conductors of the various circuits.

Figures 2, 3:
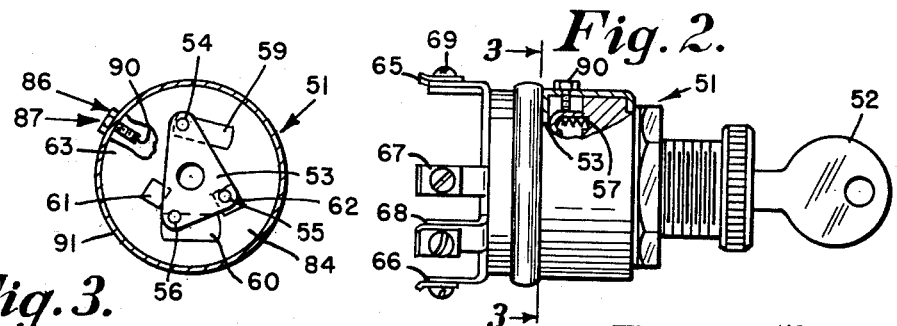
FIG. 2 is an enlarged side elevation of a preferred form of key type ignition switch incorporating the short circuit means of the invention.
FIG. 3 is an end view in section on line 3—3 of FIG. 2 and showing the switch armature in the "on" position.

The ignition circuit 70 of the automobile 30 includes the pole 71 of battery 37 connected by conductor 72 to ground in the body 36, the battery 37, the pole 73 of the battery connected by conductor 74 to terminal 65 and battery plate 59, the armature 53 of ignition switch 51, the ignition plate 60 and terminal 66, the conductor 75 to the input side of the ignition coil 34 and the conductor 76 from the ignition coil back to ground in body 36. The armature 53 is shown in position to close this circuit in FIG. 3 with contact point 54 engaging battery plate 59 and contact point 56 engaging ignition plate 60 and contact point 55 engaging accessory plate 62.

Accessory plate 62 and terminal 68 are connected by conductor 77 to an accessory such as radio 78 with a conductor 79 to ground for completing the circuit to battery 37. Starter plate 61 and terminal 67 are connected by a conductor 81 to the starter motor 82 with a conductor 83 to ground for completing the circuit to battery 37 when contact point 56 is overlying plate 61.

As thus far described the circuit is well known and conventionally, when the key 52 is turned to "off" the contact point 54 overlies an insulated area 63 of disc 64 and contact point 55 overlies a similar insulated area 84 so that while contact point 56 is overlying the elongate plate 60, no circuit is completed, or closed, to the battery 37.

However, in this invention, when the armature 53 of ignition switch 51 is moved from the closed circuit "on" terminal, or plate, 59 to the open circuit "off" position 63, short circuit means 86 is provided to connect the armature 53 directly to the grounded pole 71 of battery 37.

Preferably short circuit means 86 is conductor means 87 including a contact terminal 90 in the path of the armature 53 at the off position 63 arranged to establish electric contact therewith, the terminal 90 being grounded to the conductive switch housing 91 which in turn is connected through body 36 and grounded conductor 72 to pole 71 of battery 37. If desired, conductor means 87 may be built-in to disc 64, as shown in FIG. 1, to form a contact plate 92 having a terminal 93, corresponding to the conventional plates and terminals of the switch, and connected by a conductor 94 to ground or directly to pole 71 of battery 37.

It will be seen that if the switch 51 when in "off" position is attempted to be bypassed by a thief with a jumper wire, or with a separate source of power supply, the input side of the ignition coil 34 will continue to be short circuited since it is connected on both sides to ground.

Figures 4, 5:
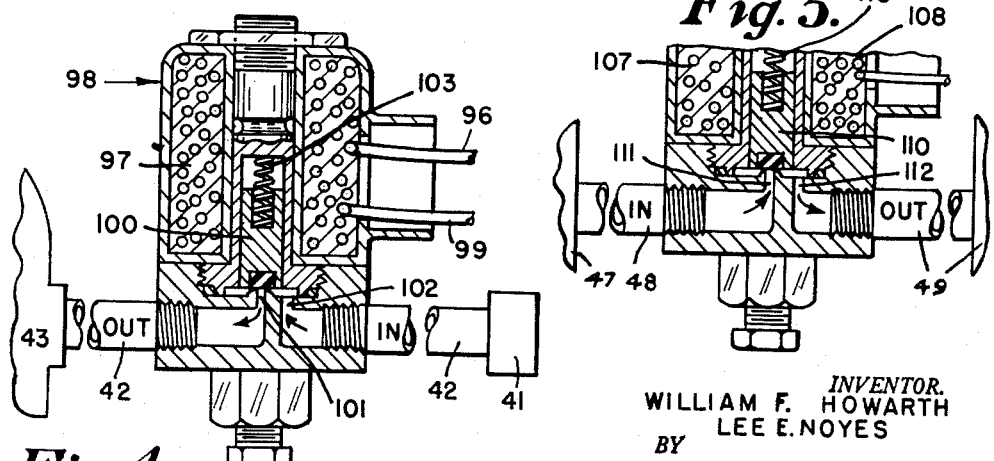
FIG. 4 is an enlarged fragmentary side elevation showing the first cut-off valve in the gasoline line.
FIG. 5 is a similar view showing the second cut-off valve in the hydraulic brake line of the vehicle.

The ignition circuit 70 preferably also includes a conductor 96 leading from terminal 66 to the coil 97 of a first solenoid cut-off valve 98 in the gasoline line 42 of the gasoline feed system 40, the coil being connected to ground in body 36 by the conductor 99. Solenoid cut-off valve 98, as shown in FIG. 4, is located between the gasoline pump 41 and the carburetor 43 and includes a slidable valve plug 100 arranged to close an effluent port 101 in downward position but arranged to open the effluent port 101 to permit fluid passage therethrough from the influent port 102 when in upward position. Valve plug 100 is normally closed by the spring 103 to cut off gasoline supply to the carburator and cannot be opened by normal line pressure from the pump.

Energization of the solenoid coil 97 by closing of the ignition circuit 70 lifts the plug 100 to open the gas supply line 42 while also overcoming the load of the spring. When the armature 53 of ignition switch 51 is in the "off" position 63, it will be seen that the ignition circuit is not only open but the circuit is grounded and the solenoid coil 97 is short circuited. This is by reason of the circuit established from ground 36 through conductor 99, solenoid coil 97, conductor 96, terminal 66, plate 60, armature 53, and conductive means 87 leading back to ground 36. the solenoid coil 97 cannot be energized to lift the valve If by chance a thief succeeds in starting the engine 32, the solenoid coil 97 cannot be energized to lift the valve plug 100, the valve plug will not be lifted by pressure from the pump and will be held closed by the spring 103, thereby causing the engine to run out of gasoline in a short distance of travel. Proper energization of the solenoid by closing of the ignition circuit 70, lifts the valve plug and causes gasoline to surge into the carburator to fill the vacuum created by drainage because of atmospheric pressure exerted on the gasoline in the fuel tank.

The ignition circuit 70 preferably also includes a conductor 106 leading from terminal 66 to the coil 107 of a second solenoid cut-off valve 108 in the hydraulic brake fluid pressure line 48 of the hydraulic brake system 45, the coil 107 being connected to ground in body 36 by the conductor 109. Solenoid cut-off valve 108, as shown in FIG. 5, is located between the master brake cylinder 47 and the fluid conduits 49 to the brakes and is identical with valve 98 but reversed. Thus in second cut-off valve 108, the slidable valve plug 110 is arranged to close an influent port 111 in downward position but arranged to open the influent port 111 to permit passage of fluid through effluent port 112 when in upward position. Valve plug 110 is normally closed by the spring 113 to cut off fluid pressure to the brakes from the master cylinder but can be opened by normal line pressure exerted by pedal 46 to force fluid through the influent port 111 against the flat face of the plug 110. Thus the brakes can always be applied regardless of the position of plug 110 although once applied the pedal will remain down and the brakes remain locked as long as the plug 110 is in the downward position. Energization of solenoid coil 107 by closing of the ignition circuit 70 lifts the plug 110 from port 111 to open the hydraulic brake line for normal operation of the brakes while also overcoming the load of spring 113. When the armature 53 of ignition switch 51 is in the "off" position 63, the ignition circuit 70 is not only open but the circuit is grounded and the solenoid coil 107 is short circuited. The circuit established is from ground 36, through conductor 109, solenoid coil 107, conductor 106, terminal 66, plate 60, armature 53 and conductive means 87 back to ground 36.

Thus if a thief attempts to by pass ignition switch 51, the input sides of ignition coil 34, the solenoid coil 97 of the gasoline cut-off valve and the solenoid coil 107 of the hydraulic brake cut-off valve will all be short circuited and grounded. Upon leaving the vehicle, with the ignition switch in off position, the driver merely depresses the brake pedal 46 and the brakes are thereby locked until the coil 107 is properly energized by closing of the ignition circuit 70 through switch 51. This not only tends to prevent unauthorized towing of the vehicle but also is a safety advantage in that the foot brakes can be held in applied position when the vehicle is parked or when on a slope.

We claim:

1. Theft prevention apparatus for gasoline engine propelled devices having a gasoline feed line, said apparatus comprising:
   an ignition circuit for said engine including a battery, an engine ignition system and an ignition switch connected to one pole of said battery;
   said switch having a conductive, grounded housing and a single armature, said armature being movable from a closed circuit "on" terminal to an open circuit "off" position, and
   conductor means, within said housing including a contact terminal in the path of said armature at said "off" position, said terminal connecting said armature to said grounded switch housing and directly grounding said ignition circuit to the other pole of said battery;
   whereby said ignition circuit and the input side of the ignition coil therein is directly circuited if said switch is attempted to be bypassed with said armature in said "off" position.

2. Theft prevention apparatus as specified in claim 1 wherein said ignition switch is of the key operated, rotatable armature, grounded cylindrical housing type and said contact terminal is a conductive element extending inwardly from said housing into the path of said armature.

3. Theft prevention apparatus as specified in claim 1 wherein said gasoline feed line includes a cut-off valve having a spring closed, solenoid coil opened, slidable, valve plug and said ignition circuit includes the coil of said solenoid,
   said solenoid coil being energized, and said plug held open, when said armature is in closed circuit "on" position but said plug being closed by said spring when said armature is in "off" position, and the input side of said solenoid coil being directly grounded to said other pole of said battery,
   whereby said valve remains closed if said switch and battery are attempted to be bypassed.

4. Theft prevention apparatus as specified in claim 1 plus a hydraulic brake system on said device;
   a cut-off valve in said system, between the master cylinder and the brakes, said valve having a spring closed, solenoid coil opened, line pressure opened, slidable, valve plug;
   said ignition circuit including the coil of said solenoid and energizing the same to open said valve plug when said armature is in the "on" position and the input side of said solenoid coil being directly grounded to said other pole of said battery when said switch is in the "off" position;
   whereby said valve plug is closed by said spring when said armature is in the "off" position but can be opened by line pressure in the direction of application of the brakes of said system.

5. Theft prevention apparatus for gasoline engine propelled devices of the type having an electric ignition system, a gasoline supply system and a hydraulic brake system, said apparatus comprising:
- a first cut-off valve in said gasoline supply system, said valve having a spring closed, solenoid coil opened, slidable valve plug therein;
- a second cut-off valve in said hydraulic brake system, said valve having a spring closed, solenoid coil opened, valve plug therein adapted to be opened against spring pressure by foot pedal pressure in said system;
- an ignition circuit including a battery, said ignition system, the solenoid coil of said first cut-off valve, the solenoid coil of said second cut-off valve and an ignition switch having a conductive, grounded housing and an armature movable from a closed circuit position to an open circuit position, and
- conductor means within said housing, including a contact terminal in the path of said armature at said open circuit position, said terminal connecting said armature to said grounded housing and directly grounding the input sides of the ignition coil of said ignition system and of said solenoid coils for short circuiting said ignition circuit and said solenoid coils, whereby attempted by-passing of said ignition switch results in a short circuit of said ignition circuit, said first solenoid coil and said second solenoid coil and maintains said ignition, gasoline and brake systems in substantially inoperative condition.

6. Theft prevention apparatus for gasoline engine propelled devices, said apparatus comprising:
- an ignition circuit for said engine including the armature of an ignition switch, a conductive grounded switch housing, a battery and the ignition coil of the engine ignition system;
- magnetic coil actuated mechanism on said device for controlling a supply of fluid essential to the operation thereof, the coil of said mechanism being in said ignition circuit, and
- conductor means entirely within said switch housing, said means including a terminal in the path of said armature connecting, said armature to ground when said ignition circuit is open and directly short circuiting the input sides of said ignition coil and the coil of said mechanism.

References Cited by the Examiner
UNITED STATES PATENTS

| | | | |
|---|---|---|---|
| 1,613,875 | 1/27 | Douglas. | |
| 2,820,149 | 1/58 | Roth | 307—10 |
| 2,869,581 | 1/59 | Perez | 137—598 |

M. CARY NELSON, *Primary Examiner.*

HENRY T. KLINKSIEK, *Examiner.*

UNITED STATES PATENT OFFICE
CERTIFICATE OF CORRECTION

Patent No. 3,174,502                                               March 23, 1965

William F. Howarth et al.

It is hereby certified that error appears in the above numbered patent requiring correction and that the said Letters Patent should read as corrected below.

Column 4, line 41, for "ignition coil therein is directly circuited if said switch" read -- ignition coil therein is directly short circuited if said switch --.

Signed and sealed this 24th day of August 1965.

(SEAL)
Attest:

ERNEST W. SWIDER
Attesting Officer

EDWARD J. BRENNER
Commissioner of Patents